US010642272B1

(12) United States Patent
Parodi

(10) Patent No.: US 10,642,272 B1
(45) Date of Patent: May 5, 2020

(54) VEHICLE NAVIGATION WITH IMAGE-AIDED GLOBAL POSITIONING SYSTEM

(71) Applicant: Amazon Technologies, Inc., Seattle, WA (US)

(72) Inventor: Carlos Guillermo Parodi, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 202 days.

(21) Appl. No.: 15/278,829

(22) Filed: Sep. 28, 2016

(51) Int. Cl.
G05D 1/02 (2020.01)
G05D 1/00 (2006.01)
B64C 39/02 (2006.01)

(52) U.S. Cl.
CPC ......... *G05D 1/0202* (2013.01); *B64C 39/024* (2013.01); *G05D 1/0088* (2013.01); *B64C 2201/12* (2013.01)

(58) Field of Classification Search
CPC combination set(s) only.
See application file for complete search history.

(56) References Cited

U.S. PATENT DOCUMENTS

| 8,035,552 | B2* | 10/2011 | Dai | G01S 19/44 342/357.23 |
| 8,174,568 | B2* | 5/2012 | Samarasekera | G01C 21/005 348/113 |
| 8,477,987 | B2* | 7/2013 | Erikkala | B66C 13/48 382/100 |
| 8,577,539 | B1* | 11/2013 | Morrison | G01C 21/165 701/28 |
| 8,676,498 | B2* | 3/2014 | Ma | G01C 21/165 345/633 |
| 8,751,151 | B2* | 6/2014 | Funk | G01C 21/206 340/539.13 |
| 9,324,151 | B2* | 4/2016 | Snavely | G06K 9/00664 |
| 9,599,993 | B2* | 3/2017 | Kumar | B64C 39/024 |
| 9,709,404 | B2* | 7/2017 | Roumeliotis | G01C 21/165 |
| 2004/0239560 | A1* | 12/2004 | Coatantiec | G01C 21/165 342/357.62 |
| 2009/0263009 | A1* | 10/2009 | Krishnaswamy | G05D 1/0253 382/154 |
| 2013/0293414 | A1* | 11/2013 | Robinson | G01S 19/05 342/357.25 |
| 2017/0341776 | A1* | 11/2017 | McClure | B64D 47/08 |

* cited by examiner

Primary Examiner — Adam D Tissot
Assistant Examiner — Edward J Pipala
(74) Attorney, Agent, or Firm — Lee & Hayes, P.C.

(57) ABSTRACT

An image-aided GPS navigation deployed on a vehicle may include a GPS receiver configured to estimate the position of the vehicle based on signals received from one or more GPS satellites. The navigation system may also include an imager configured to capture image frames associated with an environment through which the vehicle travels and estimate the relative motion of the vehicle through the environment based at least in part on the image frames. The navigation system may also include a navigation processor configured to receive the position estimation from the GPS and the relative motion estimation, and determine an updated position estimation based at least in part on the relative motion estimation.

20 Claims, 7 Drawing Sheets

VEHICLE NAVIGATION WITH IMAGE-AIDED GLOBAL POSITIONING SYSTEM

BACKGROUND

Some vehicles, such as unmanned aerial vehicles (UAVs), use a global positioning system (GPS) for navigation. GPS navigation systems receive signals from satellites and estimate the position of the vehicle based on these signals. However, the position estimation may suffer from inaccuracies sometimes inherent in less sophisticated GPS navigation systems due to, for example, noise or other problems receiving the signals. In addition, GPS navigation systems may not be able to receive the signals when, for example, the vehicle is in a location where the signals are blocked by structures, such as buildings, bridges, or tunnels, or the signals are corrupted by interference. As a result, such GPS navigation systems may not be sufficiently accurate or reliable for some implementations.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
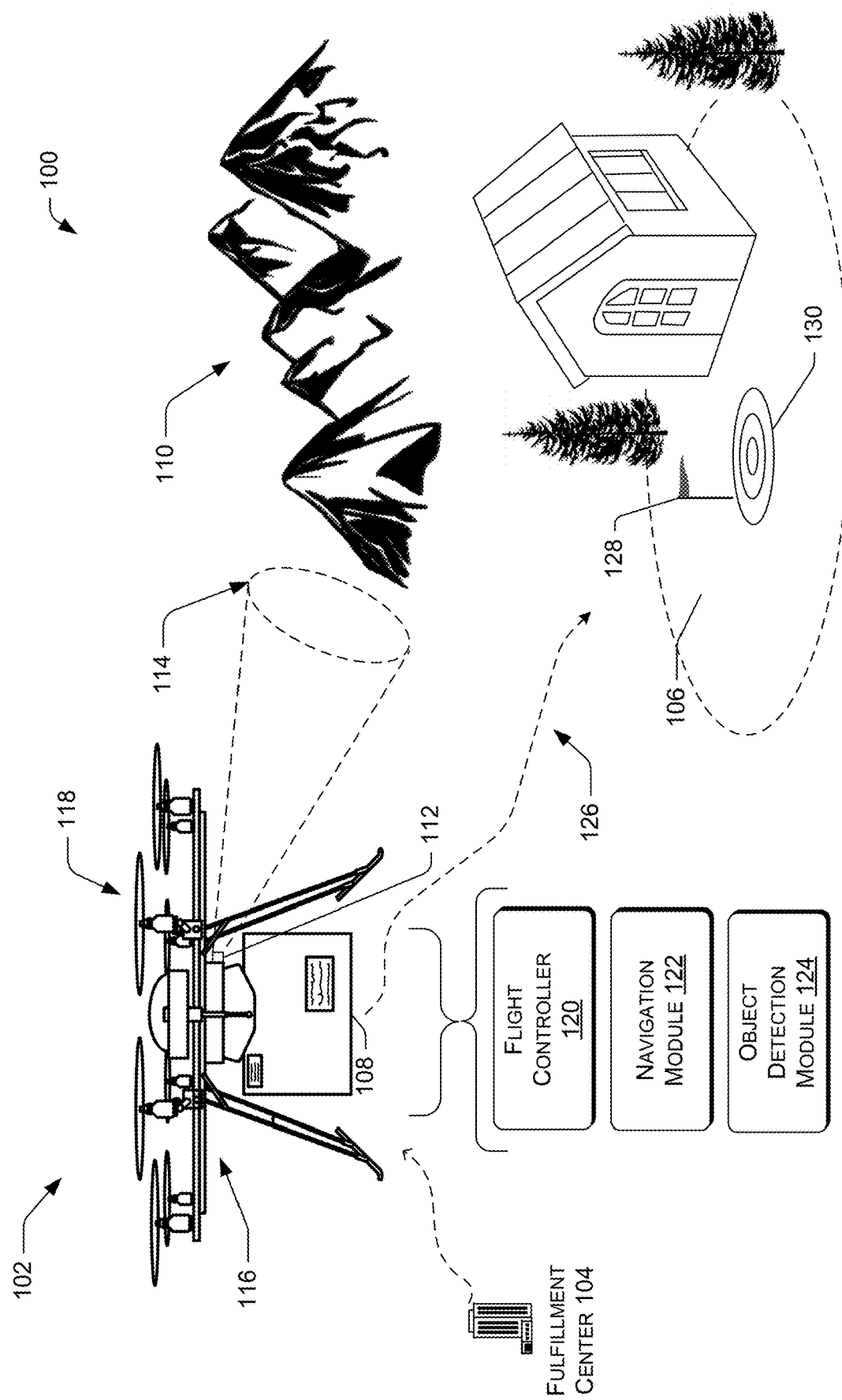
FIG. 1 is a schematic diagram of an illustrative environment that includes an unmanned aerial vehicle (UAV).

This disclosure is generally directed to use of image-aided GPS navigation deployed on a vehicle, such as a UAV. The navigation system may include a GPS receiver configured to estimate the position of the vehicle based on signals received from one or more GPS satellites. The position may be represented by the north east down (NED) position of the vehicle, where the NED position is represented by three coordinate values corresponding respectively to the vehicle position along the northern axis, the vehicle position along the eastern axis, and the vehicle position along the vertical axis. As used herein, the position may refer to one or more of the three vehicle axis positions.

The navigation system may also include an imager configured to capture image frames associated with an environment through which the vehicle travels and estimate relative motion of the vehicle through the environment based at least in part on the image frames. The navigation system may include a navigation processor configured to receive the position estimation from the GPS and the relative motion estimation, and determine an updated position estimation based at least in part on the relative motion estimation. In some examples, this may improve the accuracy and/or the reliability of the position estimation of the vehicle as compared to a navigation system that includes a GPS navigation system, but that does not update the position estimation based at least in part on a relative motion estimation obtained from an image sequence.

For example, when noise or interference adversely affect or block the signals from the GPS satellites, the navigation system may rely on the relative motion estimation to continue to update the position estimation. When the signals from the GPS satellites include noise or corruptions that would result in an inaccurate estimation of the position, the relative motion estimation may be used to mitigate or correct the inaccuracies. When the GPS satellite signals are blocked, the relative motion estimation may be used to continue to update the position estimation until the GPS satellite signals are no longer blocked. In some examples, the relative motion estimation based at least in part on the image frame sequence does not suffer from any significant drift (or increasing inaccuracy) over time.

This disclosure is also generally directed to a method of improving the accuracy of a position estimation of a vehicle provided by GPS navigation. The method may include capturing an image frame sequence associated with an environment through which the vehicle travels. The image frame sequence may include a plurality of image frames. The method may include estimating the relative motion of the vehicle based at least in part on two or more image frames of the image frame sequence, and creating new data based at least in part on the relative motion estimation and a prior in time position estimation, for example, updating the position estimation from the GPS based at least in part on the relative motion estimation and a prior in time position estimation. For example, estimating the relative motion may include identifying a marker in a first image frame of the image frame sequence, identifying the marker in a second image frame of the image frame sequence, and estimating the relative motion of the vehicle based at least in part on a first location of the marker in the first image frame and a second location of the marker in the second image frame. In some examples, the method may also include identifying a second marker in the second image frame of the image frame sequence, identifying the second marker in a third image frame of the image frame sequence, and estimating the relative motion of the vehicle based at least in part on a first location of the second marker in the second image frame and a second location of the second marker in the third image frame.

In some examples, estimating the position of the vehicle via the GPS may include estimating a distance between a GPS receiver and a GPS satellite, and adjusting the distance estimation based at least in part on the relative motion estimation. For example, estimating the distance may include determining a time for a signal from the GPS satellite to reach the GPS receiver, and estimating the distance based at least in part on the time. In some examples, adjusting the distance estimation may include limiting the distance estimation to a range of distances based at least in part on the relative motion estimation, for example, such that the distance estimation is limited to a range of distances consistent with the relative motion estimation. In some examples, the at least one GPS receiver may include at least three tracking loops, and estimating the position includes estimating respective distances between the at least three tracking loops and the three GPS satellites, and adjusting the distance estimations based at least in part on the relative motion estimation, for example, by limiting the respective distance estimations to respective ranges of distances based at least in part on the relative motion estimation.

The techniques and systems described herein may be implemented in a number of ways. Example implementations are provided below with reference to the following figures.

FIG. 1 is a schematic diagram of an illustrative environment 100 that includes a UAV 102 configured to travel through the environment 100. The example environment 100 includes a fulfillment center (FC) 104 where the UAV 102 may originate a flight directed to a destination 106, such as a location associated with a recipient of a package 108 transported by the UAV 102. The example environment 100 shown in FIG. 1 includes terrain 110, which may include various features, such as mountains, trees, buildings, bridges, telephone poles and wires, and electrical power towers and power wires.

The UAV 102 may be equipped with one or more cameras 112 providing a field of view 114, which may be used for guidance and/or navigation. For example, the camera(s) 112 may enable detection of obstacles to avoid, detect an objective marker, assist with navigation, and/or for other reasons. The UAV 102 may, at times, conduct autonomous flight using information captured by the camera(s) 112.

The UAV may be equipped with a number of components to enable the UAV 102 to perform operations during the delivery of the package 108. For example, the UAV 102 may include a frame 116 and a propulsion system 118 coupled to the frame 116 and configured to propel the UAV 102 through the environment 100. The components may also include a flight controller 120, a navigation module 122, and an object detection module 124, as well as other components discussed below with reference to FIGS. 2-4. For example, the UAV 102 may travel under control of the flight controller 120 and along the flight path 126 toward the destination 106. The flight controller 120 may receive data from the navigation module 122 to assist the flight controller 120 with following the flight path 126 to arrive at the destination 106. The flight controller 120 may continually, or from time to time, provide controls to cause change in a velocity of the UAV 102, a change in heading, a change in altitude, a change in orientation, and/or other changes (e.g., pitch, roll, yaw, hover, etc.), for example, based at least in part on data from the navigation module 122. In addition, the UAV 102 may execute different controls based on different flight scenarios, such as a takeoff stage, a transport stage, a package deposit stage, and/or a landing stage of flight.

The object detection module 124 may identify objects in imagery captured by the camera(s) 112, which may be used to inform the flight controller 120, and for other reasons, such as to provide communications to the object or to a central command, etc. For example, the object detection module 124 may identify objective markers 128 via analysis of imagery captured by the camera(s) 112. The objective markers 128 may be associated with a waypoint, a drop zone 130 for the destination 106, and/or associated with other locations.

Figure 2:
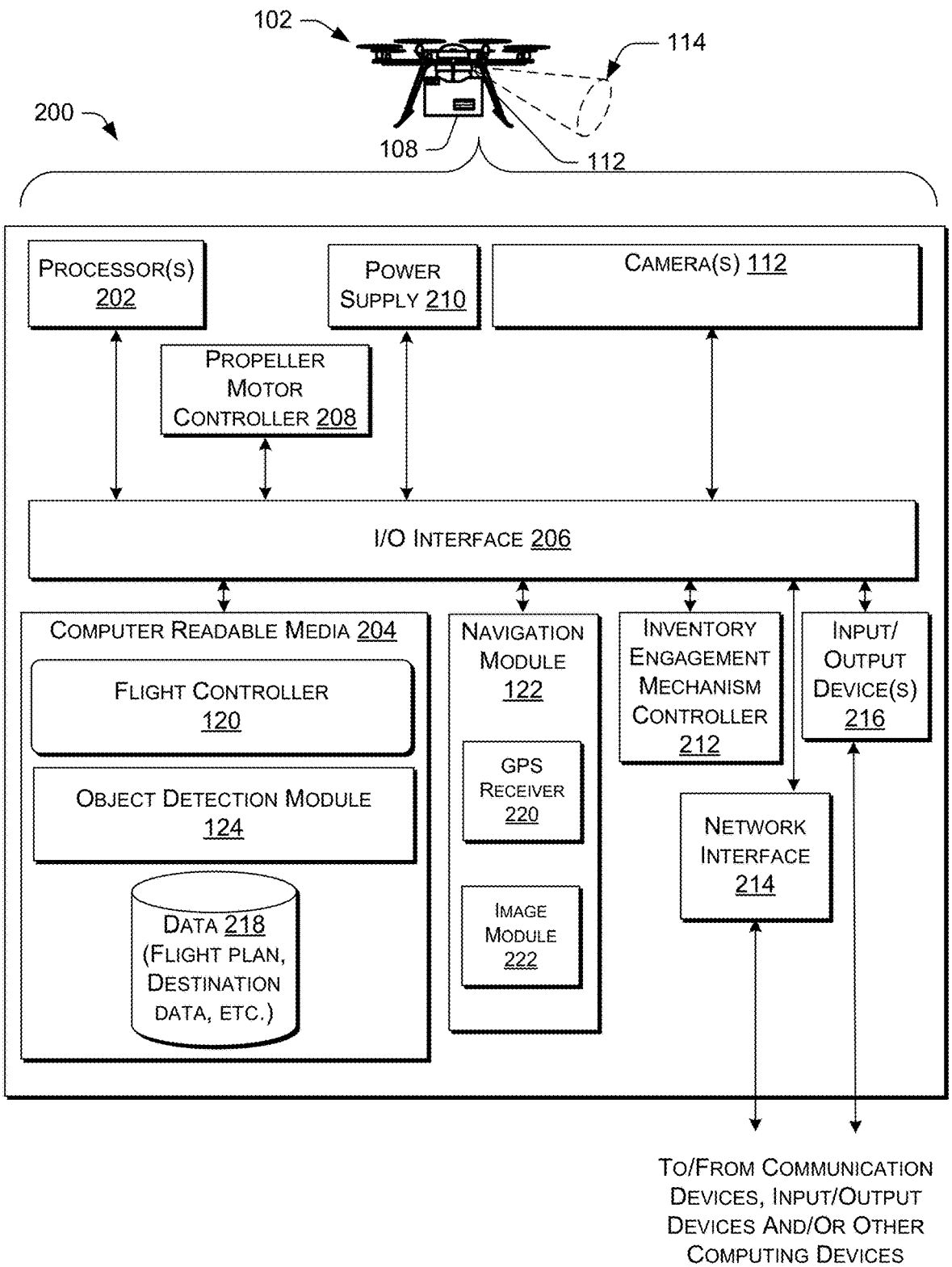
FIG. 2 is a block diagram of an illustrative UAV architecture of the UAV shown in FIG. 1.

FIG. 2 is a block diagram of an illustrative UAV architecture 200 of the UAV 102. The UAV architecture 200 may be used to implement the various systems, devices, and techniques discussed above. In the illustrated implementation, the UAV architecture 200 includes one or more processors 202, coupled to a non-transitory computer readable media 204 via an input/output (I/O) interface 206. The UAV architecture 200 may also include a propeller motor controller 208, power supply module 210, and/or the navigation module 122. The navigation module 122 may include a GPS receiver 220 and an image module 222, as explained in more detail with respect to FIGS. 3 and 4. The UAV architecture 200 further includes an inventory engagement mechanism controller 212 to interact with the package 108, the camera(s) 112, a network interface 214, and one or more input/output devices 216.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 204 may be configured to store executable instructions/modules, data, flight paths, and/or data items accessible by the processor(s) 202. In various implementations, the non-transitory computer readable media 204 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 204 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 206. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 214.

In one implementation, the I/O interface 206 may be configured to coordinate I/O traffic between the processor(s) 202, the non-transitory computer readable media 204, and any peripheral devices, the network interface 214 or other peripheral interfaces, such as input/output devices 216. In some implementations, the I/O interface 206 may perform any necessary protocol, timing or other data transformations to convert data signals from one component (e.g., non-transitory computer readable media 204) into a format suitable for use by another component (e.g., processor(s) 202). In some implementations, the I/O interface 206 may include support for devices attached through various types of peripheral buses, such as, for example, a variant of the Peripheral Component Interconnect (PCI) bus standard or the Universal Serial Bus (USB) standard. In some implementations, the function of the I/O interface 206 may be split into two or more separate components, such as, for example, a north bridge and a south bridge. Also, in some implementations, some or all of the functionality of the I/O interface

206, such as an interface to the non-transitory computer readable media 204 may be incorporated directly into the processor(s) 202.

The propeller motor controller 208 communicates with the navigation module 122 and adjusts the power of each propeller motor to guide the UAV 102 along the determined flight path 126. The power supply module 210 may control the charging and any switching functions associated with one or more power modules (e.g., batteries) of the UAV 102.

As explained herein, the navigation module 122 may include systems to facilitate navigating the UAV 102 to and/or from a location. The inventory engagement mechanism controller 212 communicates with the actuator(s) or motor(s) (e.g., a servo motor) used to engage and/or disengage inventory, such as the package 108. For example, when the UAV 102 is positioned over a level surface at a delivery location, the inventory engagement mechanism controller 212 may provide an instruction to a motor that controls the inventory engagement mechanism to release the package 108.

As shown in FIG. 2, the network interface 214 may be configured to allow data to be exchanged between the UAV architecture 200, other devices attached to a network, such as other computer systems, and/or with UAV control systems of other UAVs. For example, the network interface 214 may enable wireless communication between numerous UAVs. In various implementations, the network interface 214 may support communication via wireless general data networks, such as a Wi-Fi network. For example, the network interface 214 may support communication via telecommunications networks such as cellular communication networks, satellite networks, and the like.

The input/output devices 216 may, in some implementations, include accelerometers and/or other input/output devices commonly used in aviation. Multiple input/output devices 216 may be present and controlled by the UAV architecture 200. One or more of these sensors may be utilized to assist in landings as well as avoiding obstacles during flight.

In some embodiments, the computer readable media 204 may store the flight controller 120, the navigation module 122, and the object detection module 124. The components may access and/or write data 218, which may include flight plan data, log data, destination data, image data, and object data, and so forth. The operations of the flight controller 120, the navigation module 122, and the object detection module 124 are described above, and also below by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 102 is discussed below.

Figure 5:
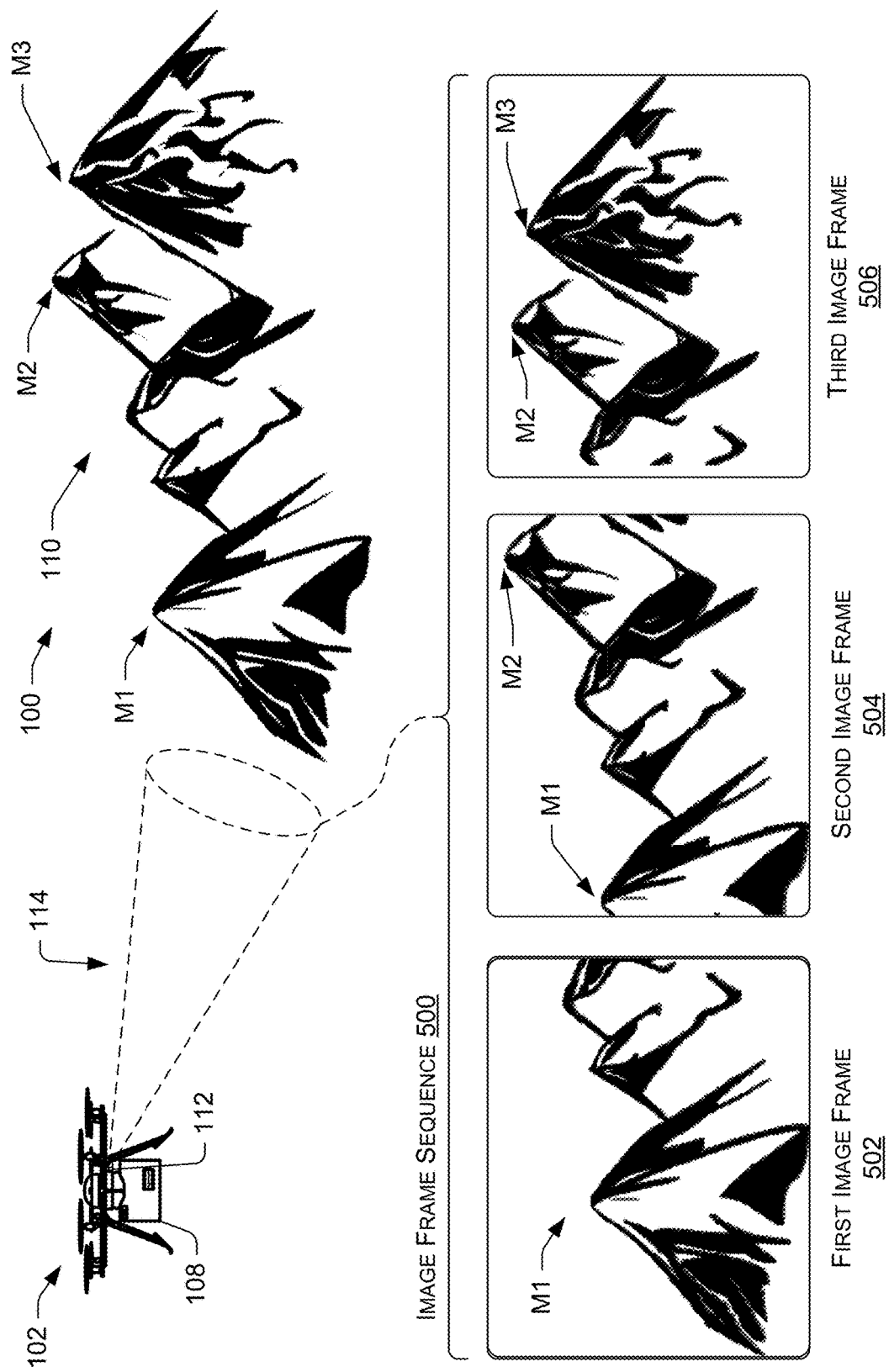
FIG. 5 is a schematic diagram of an illustrative image frame sequence.

Although FIGS. 1, 2, and 5 depict a UAV 102, other vehicles may deploy the navigation module 122 described herein, such as land vehicles (cars, trucks, etc.), marine vehicles (boats, ships, etc.), and/or other types of aircraft.

Figure 3:
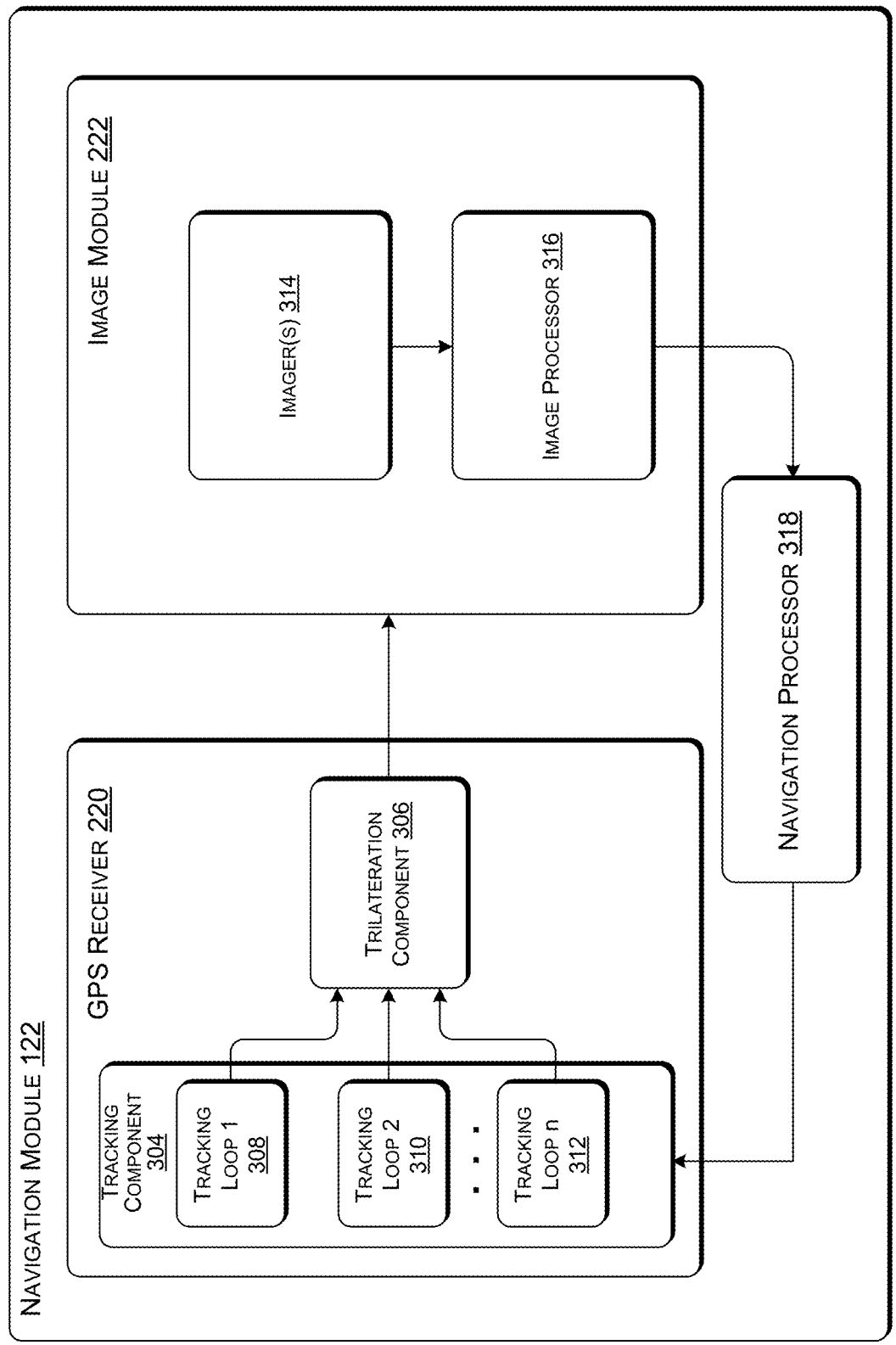
FIG. 3 is a block diagram of an illustrative navigation module for a UAV including a GPS receiver and an image module.

FIG. 3 is a block diagram of an example embodiment of the navigation module 122. In some examples, the navigation module 122 includes a GPS receiver 220 configured to estimate the position of the UAV 102, and an image module 222 configured to estimate the relative motion of the UAV 102 relative to the terrain 110 through which the UAV 102 travels. In the example shown, the GPS receiver 220 includes a tracking component 304 and a trilateration component 306 in communication with the tracking component 304. The example tracking component 304 includes at least three tracking loops: tracking loop 1 (308), tracking loop 2 (310), through tracking loop n (312), each in communication with the trilateration component 306. The GPS receiver 220 may include more tracking loops.

As explained in more detail herein, the tracking loops are configured to receive signals from respective GPS satellites and estimate the respective distances from the satellites to the GPS receiver 220. The estimated distances are provided to the trilateration component 306, which is configured to estimate the position of the GPS receiver 220, which, if coupled to the UAV 102, corresponds to the estimated position of the UAV 102.

As shown in FIG. 3, the example image module 222 of the navigation module 122 includes one or more imagers 314 in communication with an image processor 316 configured to analyze images received from the imager(s) 314. The imager(s) 314 may include the camera(s) 112 (see FIGS. 1 and 2). The imager(s) 314 may be any type of imagers known to those skilled in the art, such as, for example, high-definition cameras, high-speed cameras, analogue cameras, digital cameras, omnidirectional cameras, video cameras, rangefinder cameras, stereo cameras, thermal imaging cameras, and/or any other known types of cameras. The image processor 316 is configured to analyze the images received from the imager(s) 314 and estimate the relative motion of the UAV 102 relative to, for example, a prior in time position estimation. For example, at any given time, the imager(s) 314 capture image data of the terrain through which the UAV 102 travels, and the imager processor 316 is configured to estimate one or more of the distance, direction, and altitude through which the UAV 102 has moved relative to the position of the UAV 102 at a moment prior in time. The image processor 316 may use any image analysis techniques known to those skilled in the art, such as, for example, feature extraction techniques to identify lines, edges, ridges, textures, and shapes in the image data. In some examples, the images may be pre-processed to, for example, re-sample them, reduce noise in the data, and/or enhance the contrast in the images. In some examples, the image processor 316 may use one or more of the following techniques to analyze the images: point of interest selection, segmentation, image recognition, and image registration. In some examples, multi-view stereo techniques may be used to acquire and analyze the images.

In some examples, the image module 222 may include a navigation processor 318 configured to receive the relative motion estimation obtained from the image processor 316 and combine it with the position estimation from the GPS receiver 220. Although the example navigation processor 318 is shown as a separate component, the navigation processor 318 may be an integral part of the GPS receiver 220 and/or the image module 222. For example, the navigation processor 318 may be part of the tracking component 304 or the image processor 316. The navigation processor 318, for example, by combining the data associated with the position estimation from the GPS receiver 220 and the data associated with the relative motion estimation from the image module 222, may determine an updated position estimation.

For example, the navigation processor 318 may estimate the updated position estimation by starting from a first position estimation received from the GPS receiver 220, and adding to the first position estimation one or more of the distance, direction, and altitude change from the relative motion estimation. In other words, the navigation processor 318, from a known starting point, adds one or more of the distance of movement, the direction of movement, and the altitude change estimates to determine the position to which the UAV 102 has travelled.

Figure 4:
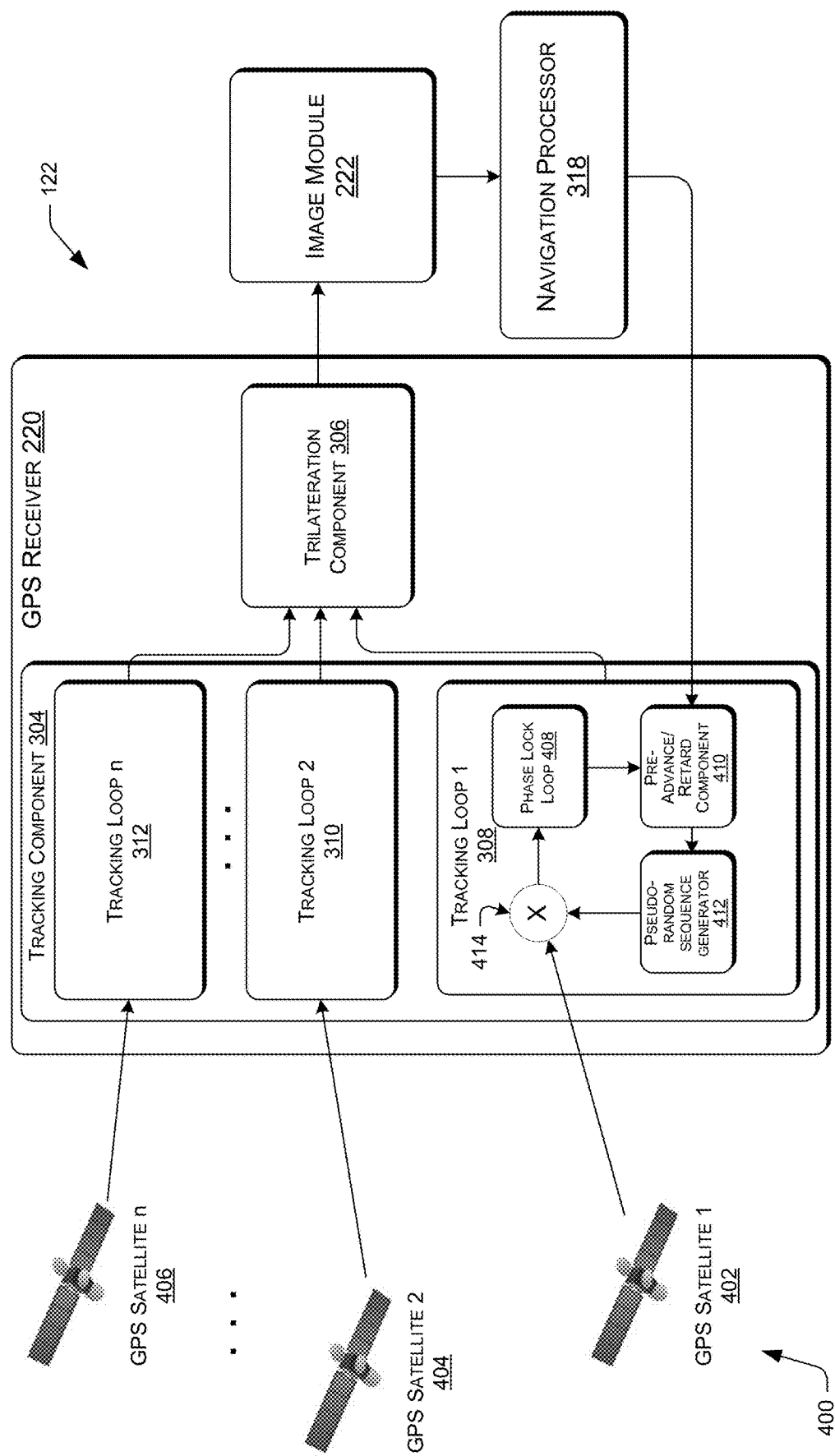
FIG. 4 is a schematic diagram of an illustrative navigation module including a GPS receiver receiving signals from GPS satellites.

As shown in FIG. 4, example GPS receiver 220 is configured to receive signals from GPS satellites 400. In the example shown, the GPS satellites 400 include GPS satellite 1 (402), GPS satellite 2 (404), through GPS satellite n (406). More than three GPS satellites are contemplated. In the example shown, tracking loop 1 (308) receives signals from GPS satellite 1 (402), tracking loop 2 (310) receives signals from GPS satellite 2 (404), and the other tracking loops through tracking loop n (312) receive signals from the other GPS satellites through GPS satellite n (406). The tracking loops are configured to estimate the distance between the respective GPS satellites 400 and the GPS receiver 220 by determining the time it takes to receive signals from the respective GPS satellites 400. Because the signals travel at a known speed (i.e., the speed of light), determining the amount of time it takes for the signals to reach the GPS receiver 220 enables calculation of the distance between each of the GPS satellites 400 and the GPS receiver 220. This distance represents the surface of a sphere, a point on which the GPS receiver 220 is located. The location of each of the GPS satellites 400 is known and may be transmitted by the GPS satellites 400 to the GPS receiver 220. By determining the distance between each of the three or more GPS satellites 402, 404, and 406, and the GPS receiver 220, the position of the GPS receiver 220 may be estimated by trilateration, which determines the point at which the surfaces of the three spheres intersect.

In the example shown in FIG. 4, tracking loop 1 (308) includes a phase lock loop 408, a pre-advance/retard component 410, a pseudo-random sequence generator 412, and a correlator 414. One or more of the other tracking loops 2 through n may also include one or more of these example components, and in systems that include more than three tracking loops, one or more of those tracking loops may include one or more of these example components.

In some examples, the time for the signals to reach the GPS receiver 220 from the GPS satellites 400 may be determined by generation of a pseudo-random sequence by pseudo-random sequence generator 412, and determining the time delay in receiving the same or similar pseudo-random sequence from the respective GPS satellite. For example, GPS satellite 1 (402) and tracking loop 1 (308) may each simultaneously generate the same or similar pseudo-random sequence. GPS satellite 1 (402) includes the pseudo-random sequence in the signals it sends, and tracking loop 1 (308) receives the signals and determines via, for example, the correlator 414 and the phase lock loop 408, the time corresponding to the delay receiving the pseudo-random sequence from GPS satellite 1 (402). This time delay corresponds to the time required for the signals to travel from GPS satellite 1 (402) to the GPS receiver 220. Because the speed of travel of the signals is known, the distance between the GPS satellite 1 (402) and the GPS receiver 220 may be determined. This process may be performed by each of the GPS satellite and tracking loop pairs, and the position of the GPS receiver 220, and thus, the UAV 102 associated with the GPS receiver 220, may be estimated via the trilateration component 306.

The position estimation from the GPS receiver 220 alone may be insufficiently accurate for certain uses. For example, noise or other problems associated with the signals received from the GPS satellites 400 may create inaccuracies in determining the distances from the GPS satellites 400 to the GPS receiver 220. For example, signal noise may cause the tracking loops to falsely identify the pseudo-random sequences received from the GPS satellite, resulting in the time delay determination being inaccurate. This, in turn, causes the distance to be inaccurate. This phenomenon may be accentuated when, for example, the tracking loops are permitted to receive rapid position changes of the GPS receiver with respect to the GPS satellites. As the rate at which position change are determined increases, the bandwidth of the signals must be widened. The widened bandwidth results in a higher probability of signal noise creating inaccuracies in the time delay determination. Thus, as the responsiveness of the GPS receiver 220 is increased, the inaccuracy of the position estimation may also increase. In addition, the GPS receiver 220 may not be able to receive the GPS satellite signals when, for example, the GPS receiver 220 is in a location where the signals are blocked by structures, such as buildings, bridges, or tunnels, or when the signals are corrupted by interference.

The example navigation module 122 shown in FIGS. 3 and 4 includes an image module 222, which may serve to increase the accuracy and/or responsiveness of the navigation module 122, for example, by improving the accuracy of the position estimation of the GPS receiver 220. For example, the image module 222 may estimate relative motion of the GPS receiver 220, and thus, the UAV 102 and provide the relative motion estimation to the tracking component 304, so that tracking loops will be able to more accurately and/or more reliably estimate the position of the GPS receiver 220. For example, the estimated relative motion provided by the image module 222 may be used by the tracking component 304 to narrow the range of possible distances determined by the tracking loops when analyzing the signals received from the GPS satellites 400. For example, without the relative motion estimation provided by the image module 222, the tracking loops may have no ability to determine whether the time delay, and thus the distance estimation, from the signals is consistent with the actual movement of the GPS receiver 220 relative to the GPS satellites 400. As a result, the tracking loops may be unable to filter inaccurate distance estimations, and thus, inaccurate position estimations. The relative motion estimation from the image module 222 may be used to determine an updated position estimation based at least in part on a prior in time position estimation received from the GPS receiver 220 and the relative motion estimation provided by the image module 222. In some examples, this may be performed by the navigation processor 318.

The updated position estimation may be used by the tracking component 304, for example, by each of the tracking loops, to filter the time delay determinations of the tracking loops to those that are consistent with the updated position estimation. For example, the updated position estimation may be used by the tracking loops to limit analysis of the range of signals of the pseudo-random sequences received from the GPS satellites 400 to a range that is consistent with the updated position estimation. In this example manner, the accuracy and/or responsiveness of the navigation module 122 may be improved.

FIG. 5 is a schematic diagram of an example environment 100 through which the UAV 102 travels, and an example of an image frame sequence 500 obtained by example operation of the image module 222. As the UAV 102 travels through environment 100, one or more of the imager(s) 314, for example, camera(s) 112, capture images of the terrain 110, which in the example depicted in FIG. 5, includes a landscape feature including mountains. Other landscape features are contemplated, such as, for example, trees, buildings, bridges, telephone poles and wires, and electrical power towers and power wires. The field of view 114 of the imager(s) 314 captures image frames including data representative of the terrain features. For example, the imager(s) 314 are configured to capture the image frame sequence 500 associated with the environment 100 through which the UAV 102 travels. The image frame sequence 500 may include a plurality of image frames. The image module 222 may include an image processor 316 in communication with the imager(s) 314, and the image processor 316 may be configured to receive image data representative of the image frames and estimate the relative motion of the UAV 102 based at least in part on two or more image frames of the image frame sequence 500. The navigation processor 318 may be in communication with the GPS receiver 220 and the image processor 316, and the navigation processor 318 may be configured to receive the position estimation, for example, from the GPS receiver 220, and the relative motion estimation from the image processor 316. The navigation processor 318 may be configured to determine an updated position estimation based at least in part on the relative motion estimation and a prior in time position estimation.

In some examples, the image processor 316 may be configured to identify a first marker M1 in a first image frame 502 of the image frame sequence 500. For example, the first marker M1 may be associated with an identifiable feature of the terrain 110, such as, for example, the peak of a particular ridge of a mountain, as shown in FIG. 5. This may be performed by various methods. As shown in FIG. 5, as the UAV 102 continues to travel through the environment 100, the imager(s) 314 may capture additional image frames, and the image processor 316 may be configured to identify the first marker M1 in a second image frame 504 of the image frame sequence 500. The image processor 316 may thereafter estimate the relative motion of the UAV 102 based at least in part on a first location of the first marker M1 in the first image frame 502 and a second location of the first marker M1 in the second image frame 504. For example, the image processor 316 may be configured estimate the relative motion of the UAV 102 based at least in part on a difference between the first location of the first marker M1 in the first image frame 502 and the second location of the first marker M1 in the second image frame 504. This difference is associated with the relative movement of the UAV 102 with respect to the point of the terrain 110 to which the first marker M1 corresponds, and thus, via analysis of the first and second image frames 502 and 504, the relative motion of the UAV 102 may be determined. The determined relative motion may include one or more of the distance of motion, the direction of motion, and a change of altitude.

In some examples, the GPS receiver 220 may be used to calibrate the image module 222. For example, the navigation module 122 (e.g., via the navigation processor 318) may be configured to compare the position estimated by the GPS receiver 220 with the relative motion estimated by the image module 222, and calibrate the output of the image module 222 accordingly based at least in part on the position estimation. In some examples, the image module 222 may be used to calibrate the GPS receiver 220. For example, the navigation module 122 (e.g., via the navigation processor 318) may be configured to compare the relative motion estimated by the image module 222 with the position estimated by the GPS receiver 220, and calibrate the output of the GPS receiver 220 accordingly based at least in part on the relative motion estimation.

As the UAV 102 continues to travel through the environment 100, the imager(s) 314 may capture additional image frames, and the image processor 316 may be configured to identify a second marker M2 in the second image frame 504 of the image frame sequence 500, as well as the second marker M2 in a third image frame 506 of the image frame sequence 500. The image processor 316 may be configured to estimate the relative motion of the UAV 102 based at least in part on a first location of the second marker M2 in the second image frame 504 and a second location of the second marker M2 in the third image frame 506, for example, in the manner described above with respect to the first marker M1. Similarly, the image processor 316 may also be configured to identify a third marker M3 in the third image frame 506 of the image frame sequence 500.

This example process may be repeated as the UAV 102 travels through the environment 100, and the image module 222 may continue to update the relative motion estimation as the imager(s) 314 continue to capture additional image frames, and the image processor 316 continues to identify and track markers through the image frames of the image frame sequence 500. In some examples, new markers may be identified as new image frames are captured to maintain marker tracking across image frames, for example, so that new markers are identified and tracked before a previously-identified and tracked marker progresses out of the image frames as the UAV 102 travels through the environment 100. In this example manner, the image processor 316 may construct an optical flow field. In some examples, techniques such as image correction, tracking error detection and removal, and/or other image analysis techniques may be used.

Figure 6:
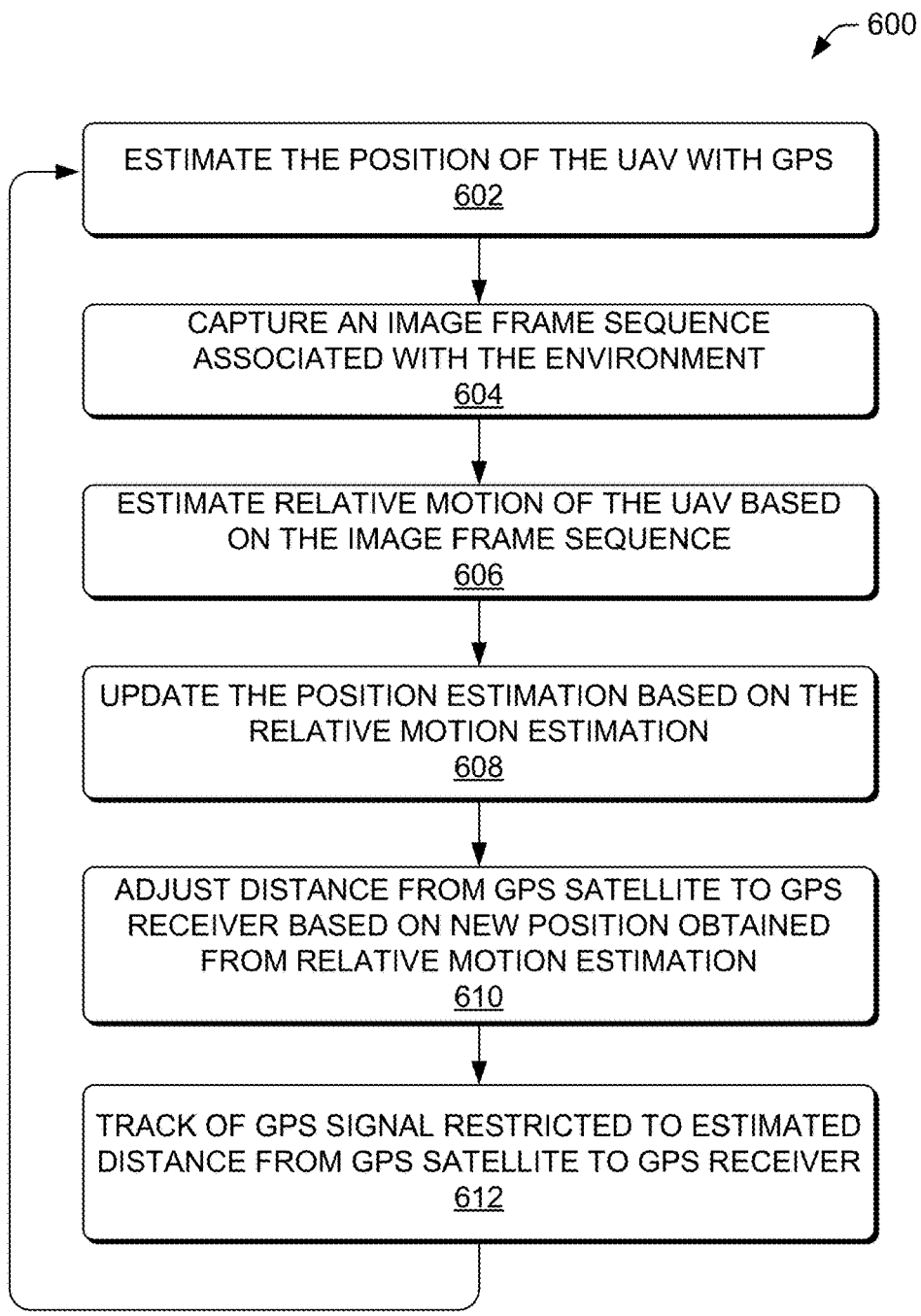
FIG. 6 is a flow diagram of an illustrative process for improving the accuracy of a GPS system using an image module.
Figure 7:
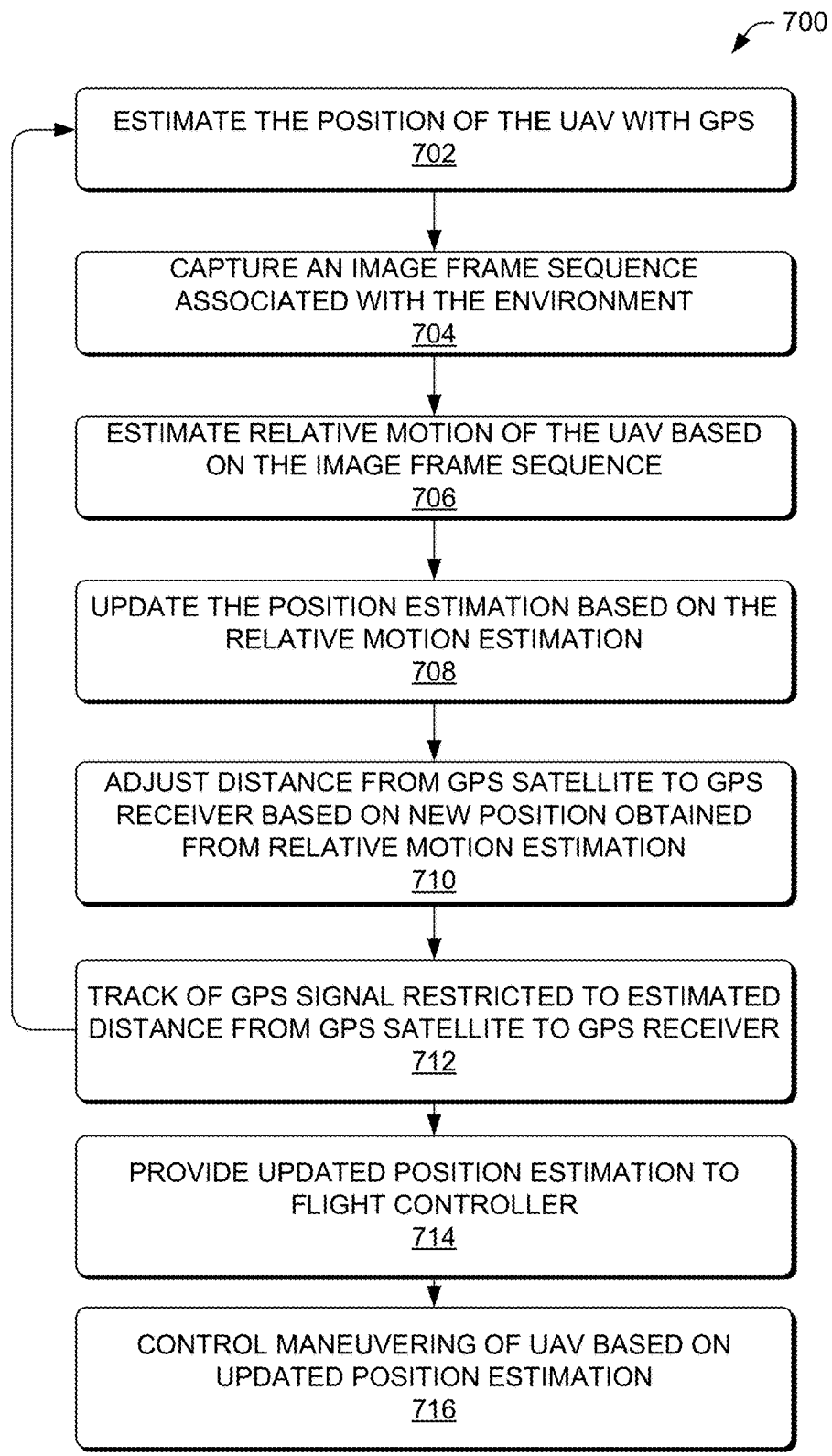
FIG. 7 is a flow diagram of an illustrative process for navigating a vehicle.

FIGS. 6 and 7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flow diagram of an illustrative process 600 to improve the accuracy of a position estimation of a vehicle (e.g., UAV 102) provided by a global positioning system. The process 600 may be implemented in the environment 100 and by the UAV architecture 200 described above, or in other environments and architectures.

In the illustrative process 600, at 602, the position of the UAV 102 may be estimated via a global positioning system. For example, estimating the position may include estimating a distance between a GPS receiver 220 and a GPS satellite 400. For example, estimating the distance may include determining the time for a signal from the GPS satellite 400 to reach the GPS receiver 220, and estimating the distance based at least in part on the time. In some examples, the GPS receiver 220 may receive signals from three or more GPS satellites 400 and estimate the respective distances between each of the GPS satellites 400 and the GPS receiver 220. The position may be estimated via the trilateration component 306 using the estimated distances.

At 604, the process 600 may include capturing an image frame sequence 500 associated with the environment 100 through which the UAV 102 travels. For example, the imager(s) 314 may capture the image frame sequence 500. The image frame sequence 500 may include a plurality of image frames including image data representative of the environment 100.

At 606, the process 600 may include estimating the relative motion of the UAV 102 based at least in part on two or more image frames of the image frame sequence 500. For example, estimating the relative motion may include identifying a first marker M1 in a first image frame 502 of the image frame sequence 500, identifying the first marker M1 in a second image frame 504 of the image frame sequence 500, and estimating the relative motion of the UAV 102 based at least in part on a first location of the first marker M1 in the first image frame and a second location of the first marker M1 in the second image frame. Estimating the relative motion may also include identifying a second marker M2 in the second image frame 504 of the image frame sequence 500, identifying the second marker M2 in a third image frame 506 of the image frame sequence 500, and estimating the relative motion of the UAV 102 based at least in part on a first location of the second marker M2 in the second image frame 504 and a second location of the second marker M2 in the third image frame 506. The identification of the markers and the relative motion estimation may be performed by the image processor 316.

At 608, the process 600 may include creating new data based at least in part on the relative motion estimation and a prior in time position estimation (e.g., updating the position estimation from the GPS based at least in part on the relative motion estimation and a prior in time position estimation). For example, the navigation processor 318 may be in communication with the GPS receiver 220 and the image processor 316, and the navigation processor 318 may be configured to receive the position estimation, for example, from the GPS receiver 220, and the relative motion estimation from the image processor 316. The navigation processor 318 may be configured to determine an updated position estimation based at least in part on the relative motion estimation and a prior in time position estimation.

At 610, the process 600 may include adjusting the distance estimation of the GPS receiver 220 based at least in part on the relative motion estimation. For example, adjusting the distance estimation may include limiting the distance estimation to a range of distances based at least in part on the relative motion estimation. In some embodiments, limiting the distance estimation may include limiting the distance estimation to a range of distances consistent with the relative motion estimation. In some examples, the distance from the GPS receiver 220 to the GPS satellite 400 may be based on the new position estimation obtained at least in part from the relative motion estimation.

At 612, the adjusted distance estimation may be used to estimate the distance from the GPS satellite 400 to the GPS receiver 220. For example, the adjusted distance estimations may be used by the tracking loops to limit analysis of the range of signals of the pseudo-random sequences received from the GPS satellites 400 to a range that is consistent with the updated position estimation. In this example manner, the accuracy and/or the responsiveness of the navigation module 122 may be improved. In some examples, the track of the signals from the GPS satellite 400 may be restricted to the estimated distance from the GPS satellite 400 to the GPS receiver 220. In some examples, the range of distances from step 610 may be used to determine a corresponding range of times for the signals to travel from the GPS satellite 400 to the GPS receiver 220 based on the known speed of the signals from the GPS satellite 400. In such examples, the GPS receiver 220 may use the range of times to limit its analysis of the signals received from the GPS satellite 400 to those that are consistent with the range of times.

In some examples of the process 600, the steps relating to the position estimation may be synchronized with the steps relating to the relative motion estimation. In some examples of the process 600, the steps relating to the position estimation may not be synchronized with the steps relating to the relative motion estimation.

FIG. 7 is a flow diagram of an illustrative process 700 for navigating a vehicle (e.g., UAV 102). The process 700 may be implemented in the environment 100 and by the UAV architecture 200 described above, or in other environments and architectures.

In the illustrative process 700, at 702, the position of the UAV 102 may be estimated via a global positioning system. For example, estimating the position may include estimating a distance between a GPS receiver 220 and a GPS satellite 400. For example, estimating the distance may include determining a time for a signal from the GPS satellite 400 to reach the GPS receiver 220, and estimating the distance based at least in part on the time. In some examples, the GPS receiver 220 may receive signals from three or more GPS satellites 400 and estimate the respective distances between each of the GPS satellites 400 and the GPS receiver 220. The position may be estimated via the trilateration component 306 using the estimated distances.

At 704, the process 700 may include capturing an image frame sequence 500 associated with the environment 100 through which the UAV 102 travels. For example, the imager(s) 314 may capture the image frame sequence 500. The image frame sequence 500 may include a plurality of image frames including image data representative of the environment 100.

At 706, the process 700 may include estimating the relative motion of the UAV 102 based at least in part on two or more image frames of the image frame sequence 500. For example, estimating the relative motion may include identifying a first marker M1 in a first image frame 502 of the image frame sequence 500, identifying the first marker M1 in a second image frame 504 of the image frame sequence 500, and estimating the relative motion of the UAV 102 based at least in part on a first location of the first marker M1 in the first image frame and a second location of the first marker M1 in the second image frame. Estimating the relative motion may also include identifying a second marker M2 in the second image frame 504 of the image frame sequence 500, identifying the second marker M2 in a third image frame 506 of the image frame sequence 500, and estimating the relative motion of the UAV 102 based at least in part on a first location of the second marker M2 in the second image frame 504 and a second location of the second marker M2 in the third image frame 506. The identification of the markers and the relative motion estimation may be performed by the image processor 316.

At 708, the process 700 may include updating the position estimation from the GPS based at least in part on the relative motion estimation and a prior in time position estimation. For example, the navigation processor 318 may be in communication with the GPS receiver 220 and the image processor 316, and the navigation processor 318 may be configured to receive the position estimation, for example, from the GPS receiver 220, and the relative motion estimation from the image processor 316. The navigation processor 318 may be configured to determine an updated position estimation based at least in part on the relative motion estimation and a prior in time position estimation.

At 710, the process 700 may include adjusting the distance estimation of the GPS receiver 220 based at least in part on the relative motion estimation. For example, adjusting the distance estimation may include limiting the distance estimation to a range of distances based at least in part on the relative motion estimation. In some embodiments, limiting the distance estimation may include limiting the distance estimation to a range of distances consistent with the relative motion estimation. In some examples, the distance from the GPS receiver 220 to the GPS satellite 400 may be based on the new position estimation obtained at least in part from the relative motion estimation.

At 712, the adjusted distance estimation may be used to estimate the distance from the GPS satellite 400 to the GPS receiver 220. For example, the adjusted distance estimations may be used by the tracking loops to limit analysis of the range of signals of the pseudo-random sequences received from the GPS satellites 400 to a range that is consistent with the updated position estimation. In some examples, the track of the signals from the GPS satellite 400 may be restricted to the estimated distance from the GPS satellite 400 to the GPS receiver 220. In some examples, the range of distances from step 710 may be used to determine a corresponding range of times for the signals to travel from the GPS satellite 400 to the GPS receiver 220 based on the known speed of the signals from the GPS satellite 400. In such examples, the GPS receiver 220 may use the range of times to limit its analysis of the signals received from the GPS satellite 400 to those that are consistent with the range of times.

At 714, the updated position estimation may be provided to the flight controller 120. For example, the navigation module 122 may provide the updated position estimation to the flight controller 120.

At 716, the flight controller 120 may control maneuvering of the UAV 102 based at least in part on the updated position estimation. For example, the flight controller 116 may control the operation of one or more of the propeller motor controller 208, the power supply 210, the camera(s) 112, the inventory engagement mechanism controller 212, the network interface 214, and the input/output device(s) 216 based at least in part on the updated position estimation. For example, the flight controller 116 may control maneuvering of the UAV 102 to maintain the flight path 126 to reach the desired destination 106.

In some examples of the process 700, the steps relating to the position estimation may be synchronized with the steps relating to the relative motion estimation. In some examples of the process 700, the steps relating to the position estimation may not be synchronized with the steps relating to the relative motion estimation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system to navigate a vehicle, the system comprising:
a global positioning system (GPS) receiver configured to receive signals from a plurality of satellites and estimate a position of the vehicle based at least in part on the signals;
an imager configured to capture an image frame sequence associated with an environment through which the vehicle travels, the image frame sequence comprising a plurality of image frames;
an image processor in communication with the imager and configured to receive image data representative of the image frames and estimate a relative motion of the vehicle based at least in part on two or more image frames of the image frame sequence; and
a navigation processor in communication with the GPS receiver and the image processor, the navigation processor being configured to:
receive a first position from the GPS receiver;
receive the relative motion from the image processor;
determine an updated position estimation based at least in part on the relative motion and a prior in time position estimation;
estimate respective distances between the GPS receiver and the plurality of satellites based at least in part on the updated position estimation; and
receive a second position from the GPS receiver determined based at least in part on the respective distances between the GPS receiver and the plurality of satellites.

2. The system as recited in claim 1, wherein the system is implemented on an unmanned aerial vehicle (UAV), and further comprising:
one or more processors; and
memory to store a navigation module executable by the one or more processors to estimate the position of the UAV based at least in part on the position and the updated position estimation.

3. The system as recited in claim 1, wherein the image processor is configured to identify a landscape feature in a first image frame of the image frame sequence, identify the landscape feature in a second image frame of the image frame sequence, and estimate the relative motion of the vehicle based at least in part on a first location of the landscape feature in the first image frame and a second location of the landscape feature in the second image frame.

4. The system as recited in claim 3, the image processor is configured estimate the relative motion of the vehicle based at least in part on a difference between the first location and the second location.

5. The system as recited in claim 3, wherein the image processor is configured to identify a second landscape feature in the second image frame of the image frame sequence, identify the second landscape feature in a third image frame of the image frame sequence, and estimate the relative motion of the vehicle based at least in part on a first location of the second landscape feature in the second image frame and a second location of the second landscape feature in the third image frame.

6. The system of claim 1, wherein the navigation processor is further configured to adjust the respective distances between the GPS receiver and the plurality of satellites by limiting the respective distances to ranges of distances based at least in part on the relative motion.

7. A method to improve an accuracy of a position estimation of a vehicle provided by a global positioning system (GPS), the method comprising:
capturing, via an imager, an image frame sequence associated with an environment through which the vehicle travels, the image frame sequence comprising a plurality of image frames;
estimating, via an image processor, a relative motion of the vehicle based at least in part on two or more image frames of the image frame sequence;
estimating a distance between a GPS receiver and a GPS satellite;
adjusting the distance between the GPS receiver and the GPS satellite to determine an adjusted distance based at least in part on the relative motion of the vehicle; and
estimating a position of the vehicle via the GPS based at least in part on the adjusted distance.

8. The method as recited in claim 7, wherein estimating the relative motion comprises:
identifying a marker in a first image frame of the image frame sequence;
identifying the marker in a second image frame of the image frame sequence; and
estimating the relative motion of the vehicle based at least in part on a first location of the marker in the first image frame and a second location of the marker in the second image frame.

9. The method as recited in claim 8, further comprising:
identifying a second marker in the second image frame of the image frame sequence;
identifying the second marker in a third image frame of the image frame sequence; and
estimating the relative motion of the vehicle based at least in part on a first location of the second marker in the second image frame and a second location of the second marker in the third image frame.

10. The method as recited in claim 7, wherein estimating the distance comprises determining a time for a signal from the GPS satellite to reach the GPS receiver, and estimating the distance based at least in part on the time.

11. The method as recited in claim 7, wherein adjusting the distance comprises limiting the distance to a range of distances based at least in part on the relative motion.

12. The method as recited in claim 11, further comprising determining a range of times based at least in part on the range of distances, and limiting the position obtained from the GPS receiver based at least in part on the range of times.

13. The method as recited in claim 7, further comprising estimating the position of the vehicle via the GPS, and wherein estimating the position comprises estimating respective distances between the GPS receiver and at least three GPS satellites, and adjusting the respective distances based at least in part on the relative motion.

14. The method as recited in claim 13, wherein the GPS receiver comprises at least three tracking loops, and estimating the position comprises estimating respective distances between the at least three tracking loops and the at least three GPS satellites, and adjusting the respective distances between the at least three tracking loops and the at least three GPS satellites based at least in part on the relative motion.

15. The method as recited in claim 14, wherein adjusting the respective distances between the at least three tracking loops and the at least three GPS satellites comprises limiting the respective distances between the at least three tracking loops and at least three GPS satellites to respective ranges of distances based at least in part on the relative motion.

16. A vehicle comprising:
a frame;
a propulsion system coupled to the frame to cause movement of the vehicle;
a global positioning system (GPS) receiver configured to estimate a position of the vehicle;
an imager configured to capture image frames associated with an environment through which the vehicle travels and estimate a relative motion of the vehicle based at least in part on the image frames;
a navigation processor configured to receive the position from the GPS receiver and the relative motion, and determine an updated position estimation based at least in part on the relative motion;
one or more processors; and
memory to store computer-executable instructions executable by the one or more processors, the computer-executable instructions including a navigation module to estimate the position of the vehicle based at least in part on the updated position estimation of the vehicle,
wherein the navigation processor is configured to determine the updated position estimation by estimating a distance between the GPS receiver and a GPS satellite, and adjusting the distance based at least in part on the relative motion.

17. The vehicle as recited in claim 16, wherein the GPS receiver is configured to receive signals from a plurality of satellites and estimate the position of the vehicle based at least in part on the signals.

18. The vehicle as recited in claim 17, wherein the imager is configured to capture an image frame sequence associated with the environment through which the vehicle travels, the image frame sequence comprising a plurality of image frames, and wherein the vehicle further comprises an image processor in communication with the imager and configured to receive image data representative of the image frames and estimate the relative motion of the vehicle based at least in part on two or more image frames of the image frame sequence.

19. The vehicle as recited in claim 18, wherein the navigation processor is in communication with the GPS receiver and the image processor, and the navigation processor is configured to:
  receive the position from the GPS receiver;
  receive the relative motion from the image processor; and
  determine the updated position estimation based at least in part on the relative motion and a prior in time position estimation.

20. The vehicle as recited in claim 19, wherein the image processor is configured to identify a marker in a first image frame of the image frame sequence, identify the marker in a second image frame of the image frame sequence, and estimate the relative motion of the vehicle based at least in part on a first location of the marker in the first image frame and a second location of the marker in the second image frame.

* * * * *